United States Patent [19]

Jenicot

[11] Patent Number: 4,636,618
[45] Date of Patent: Jan. 13, 1987

[54] ELECTRIC FRYER

[76] Inventor: Jean-Marie Jenicot, Rue de Mellery,19 B, B-5862 Gentinne, Belgium

[21] Appl. No.: 674,955

[22] PCT Filed: Mar. 2, 1984

[86] PCT No.: PCT/BE84/00005
§ 371 Date: Oct. 30, 1984
§ 102(e) Date: Oct. 30, 1984

[87] PCT Pub. No.: WO84/03427
PCT Pub. Date: Sep. 13, 1984

[30] Foreign Application Priority Data

Mar. 4, 1983 [BE] Belgium ............................ 0/210258

[51] Int. Cl.<sup>4</sup> ........................ F27D 11/00; A47J 27/00
[52] U.S. Cl. .................................... 219/441; 220/368;
220/82 R; 219/438
[58] Field of Search ............... 219/441, 438, 436, 442,
219/440; 126/381, 382; 99/341, 408, 403, 444,
446; 15/250.10; 220/373, 368, 374, 82 R, 82 A,
82.5

[56] References Cited

U.S. PATENT DOCUMENTS

| 1,452,018 | 4/1923 | Allen | 15/250.10 |
| 4,148,250 | 4/1979 | Miki | 99/403 |
| 4,487,117 | 12/1984 | Colley | 99/341 |

FOREIGN PATENT DOCUMENTS

| 870419 | 3/1979 | Belgium . | |
| 2155541 | 5/1973 | Fed. Rep. of Germany | 15/250.10 |
| 1753812 | 8/1973 | Fed. Rep. of Germany | 99/403 |
| 2435447 | 2/1975 | Fed. Rep. of Germany | 99/408 |
| 2931859 | 2/1981 | Fed. Rep. of Germany . | |
| 1517736 | 3/1968 | France . | |
| 1151736 | 3/1968 | France . | |
| 94105 | 5/1969 | France . | |
| 2239224 | 2/1975 | France . | |
| 2119635 | 11/1983 | United Kingdom | 219/438 |

Primary Examiner—E. A. Goldberg
Assistant Examiner—Teresa J. Walberg
Attorney, Agent, or Firm—Walter H. Schneider

[57] ABSTRACT

An electric fryer includes a filtering lid with upper and lower condensation walls which define between them a condensation chamber. A reflector is located between the lower condensation wall and the cooking chamber and a filter is carried by the upper condensation wall. The lid also includes a rotatable window with a scrapper.

8 Claims, 21 Drawing Figures

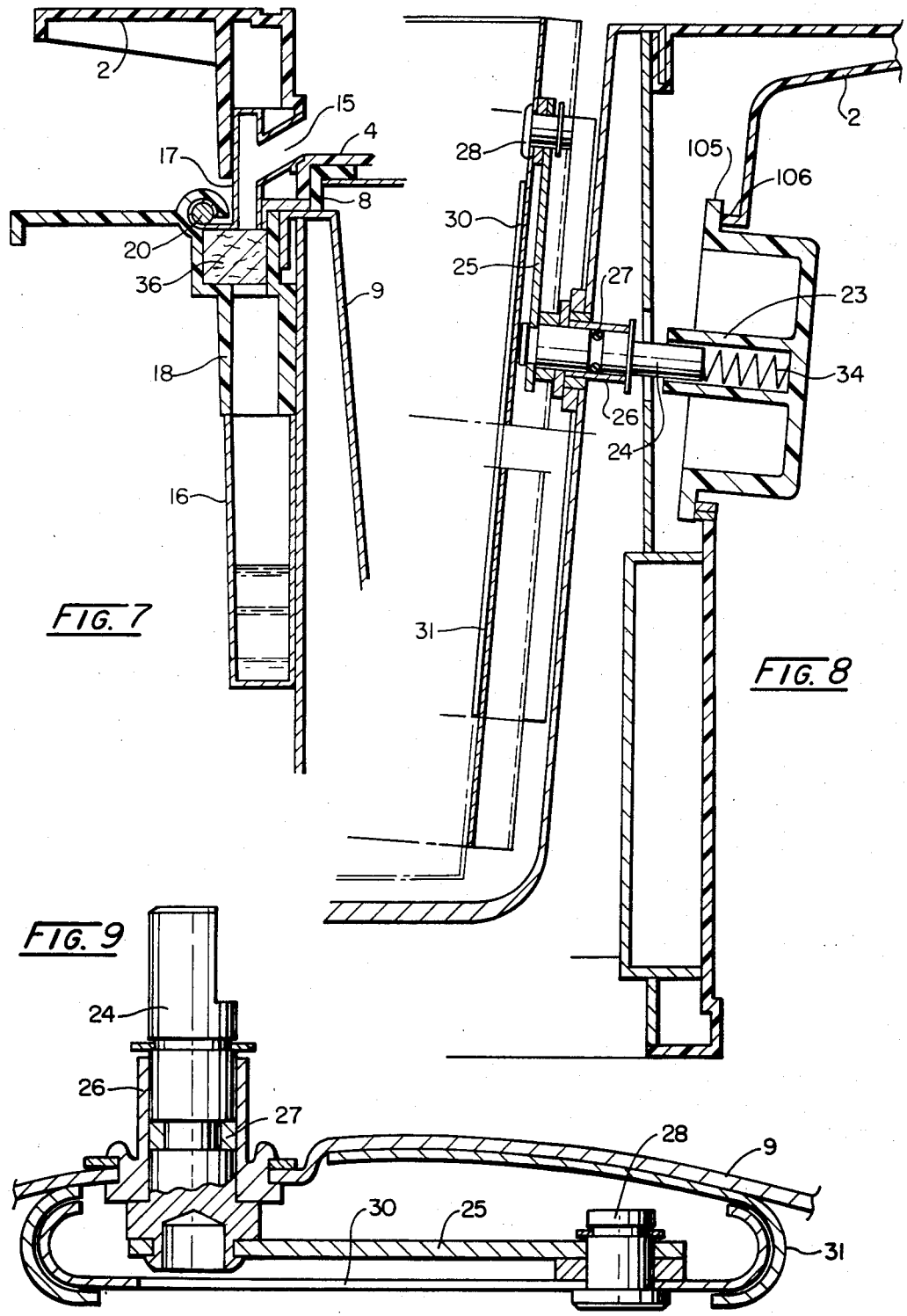

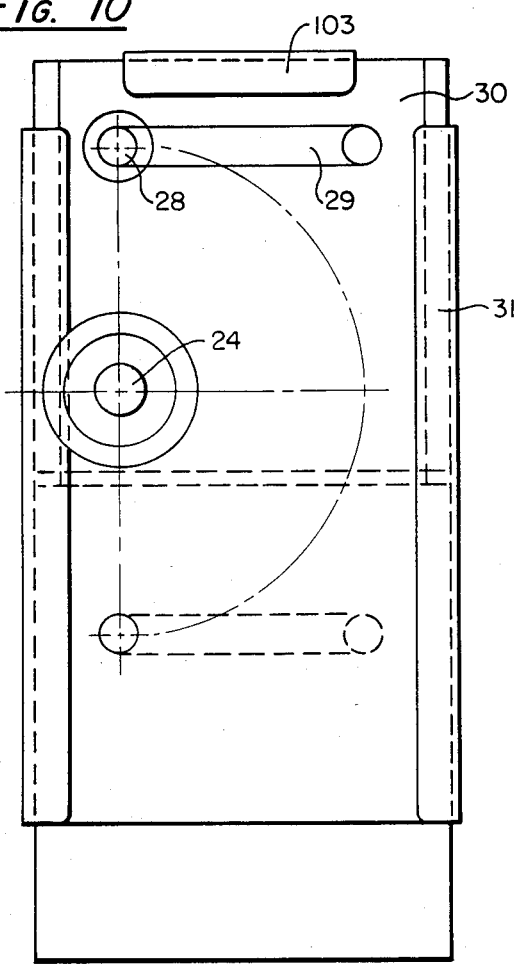
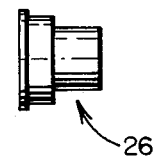
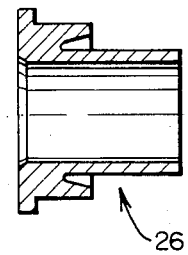
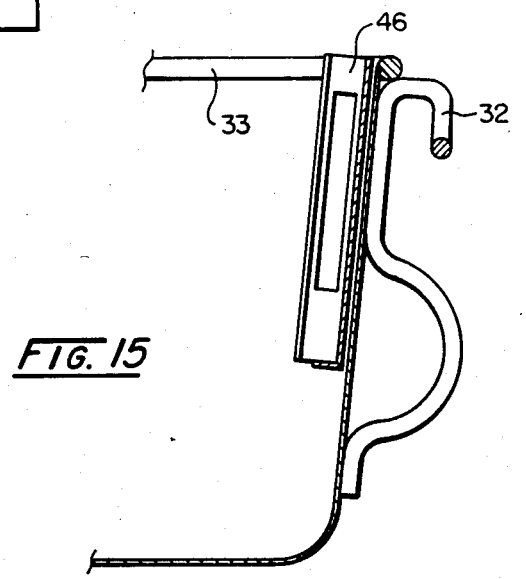

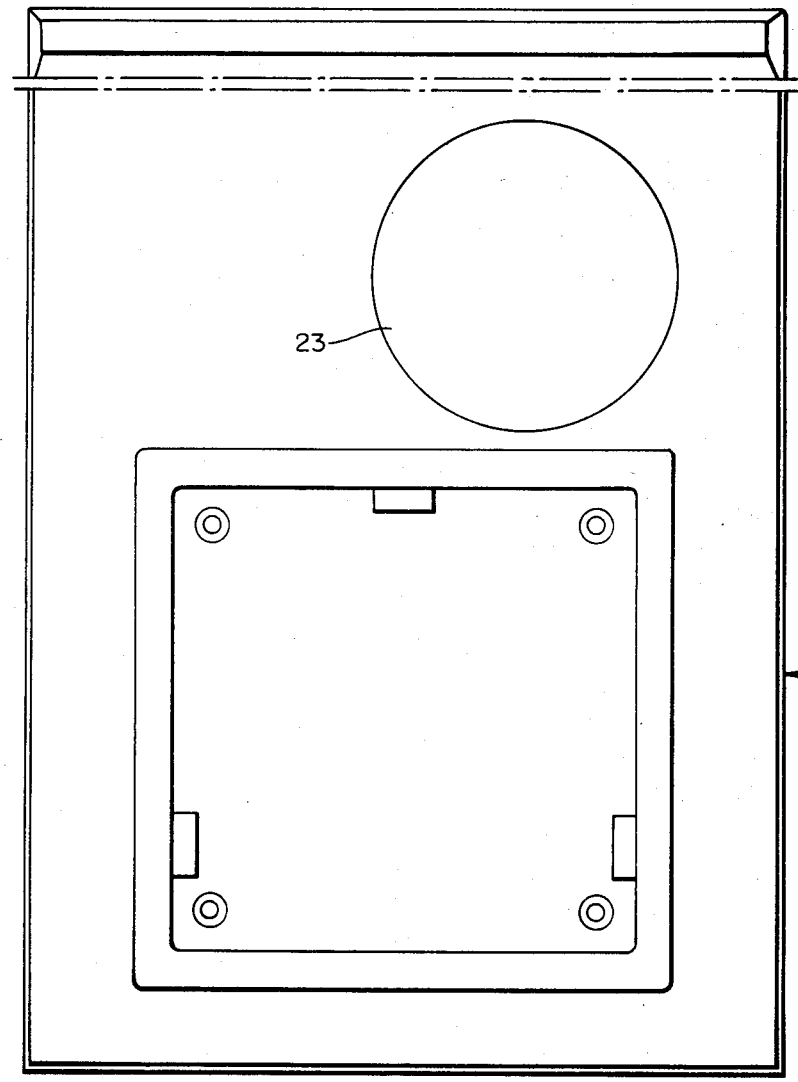
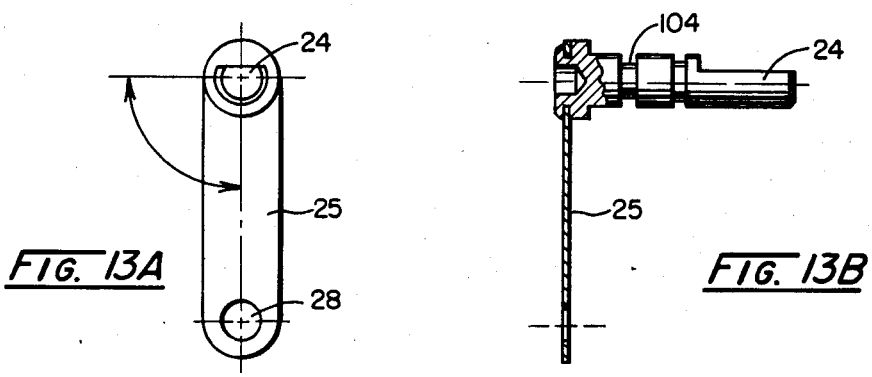

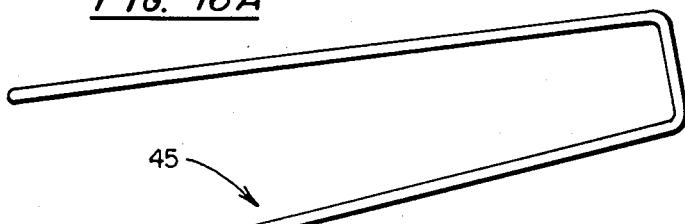
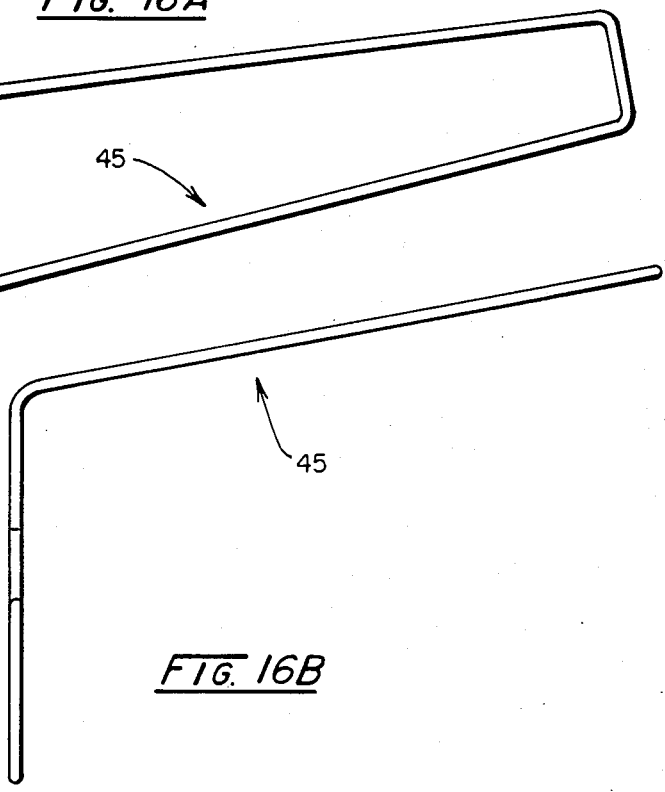
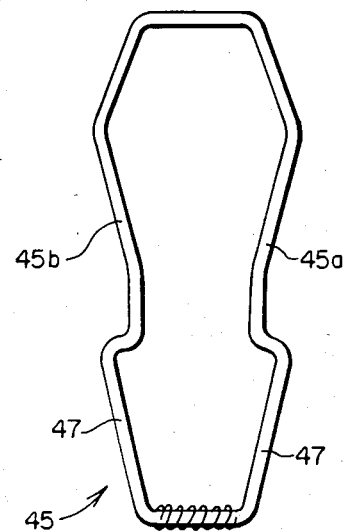
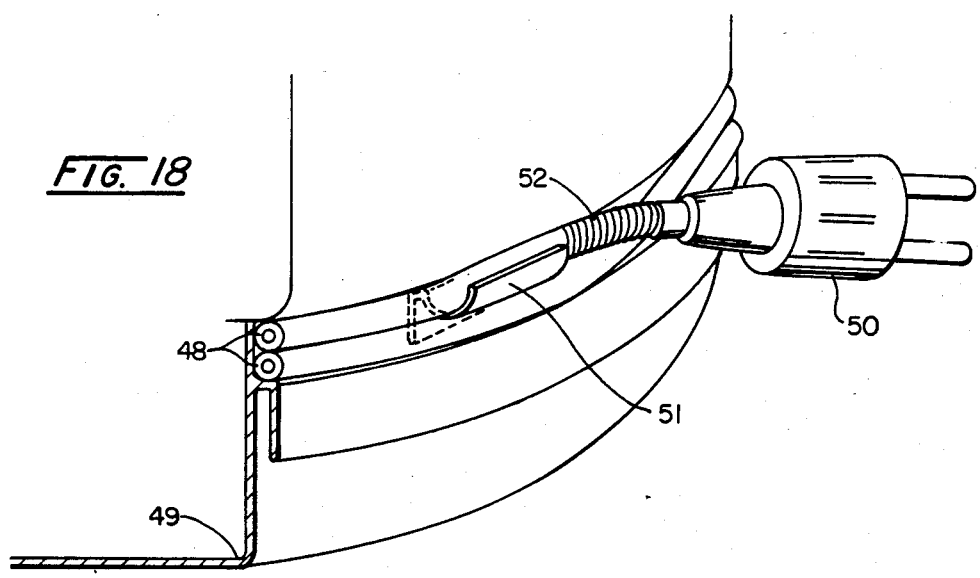

ELECTRIC FRYER

The present invention relates to an electric fryer, and especially the particular development of the filtering lid and of the viewing window equipped with a cleaning system ensuring optimum viewing of the contents situated within the cooking chamber.

Most of the many fryers at present on the market have a filtering lid whereby some of the odours can be removed by passing them through a filtering cartridge made of activated carbon.

However, all these filtering lids have the following disadvantages: because of the temperature of the oil, the cooking of foodstuffs and especially foodstuffs containing a very high proportion of water causes this water to be transformed into vapours which are carried along at the same time as the oil vapours and pass through the filtering cartridge and saturate it very quickly, resulting in frequent replacement of this expensive element; it is also found that in existing models these vapours condense on the internal surface of the lid situated directly above the oil pool. This phenomenon, caused by the temperature difference between the external wall and the internal wall of the lid, results in condensates being present on the surface described above. Consequently, in view of the very small surface of this internal wall and the considerable quantity of water vapours, very rapid saturation of this surface is found to occur, and this, due to the saturation, results in some of the condensates returning into the pool of oil.

These two phenomena have the following disadvantages:

Condensates which remain present on the internal surface of the lid at the end of a cooking operation and which have not been taken into the oil pool during cooking fall back into the oil pool when the lid is opened and is put into a vertical position relatively to the horizontal plane of the fryer.

Moreover these condensates have an unpleasant taste, which is passed on to the oil pool and has a very disadvantageous effect on the natural taste of foodstuffs prepared normally in a fryer used without a filtering lid.

This phenomenon of condensation on the internal surface also has the following disadvantage: it causes a more or less high saturation of the water vapour contained in the chamber situated between the lid and the cooking oil pool.

This water vapour saturation also results in changing the taste of the food where the fryer concerned has a basket lifting system operatable from the exterior without the filtering lid having to be opened.

Accordingly, the food situated in that zone reabsorbs the water vapour and in so doing takes on the unpleasant taste of the water vapour although to a lesser degree.

The present invention provides a fryer which does not have the aforesaid disadvantages due to the fact that the lid comprises, taken in the upward direction from below, a shield or reflector, a lower condensation wall, an upper condensation wall, a condensation chamber between the lower and upper condensation walls, a communication means between the cooking chamber and the condensation chamber, filter means carried by the upper condensation wall, a communication means between the condensation chamber and the exterior through these filter means, also a means for discharging water of condensation towards the exterior.

Some fryers which are at present commercially available are provided with a translucent window which is fixed on the wall of the lid and is intended to allow the user to view the food inside the cooking chamber without opening the lid.

None of the systems developed up to the present day are of optimum effectiveness, inasmuch as condensation of water vapour and oil vapour inevitably occurs on the internal wall of the window.

Nor have any of the various systems developed for obviating this disadvantage been really effective.

To obviate the disadvantages of known viewing window systems, the lid of the fryer according to the invention is provided with a window mounted rotatably in the lid and provided with a scraper. The window especially comprises an upper shell and a lower shell which are arranged to be capable of rotating in sealing-tight manner in a compartment, the lower portion of the window extending through not only the lower condensation wall but also the reflector, such that the lower surface of the shell is situated in the cooking chamber, a support integral with the lid being provided at the lower portion of the assembly described above, this support comprising a scraper whose upper portion is in permanent contact with the lower surface of the shell.

Other features of the invention will become apparent from the description given hereinafter with reference to the accompanying drawings wherein:

FIG. 7 shows a view in section of the hinge and the water of condensation collector;

FIG. 8 shows a view in section of the mechanism for raising and lowering the chip basket, and FIG. 9 shows a horizontal section view of this mechanism;

FIG. 10 shows a plan view of this same mechanism for raising and lowering the chip basket;

FIGS. 11 to 13 show details of the said mechanism;

FIG. 14 shows an overall plan view of the control console of the fryer;

FIG. 15 shows a detail of the chip basket latching device;

FIGS. 16A, B and C illustrate a handle for holding the chip basket;

FIG. 17 illustrates the system for tidying away the supply cable and

Figure 1:
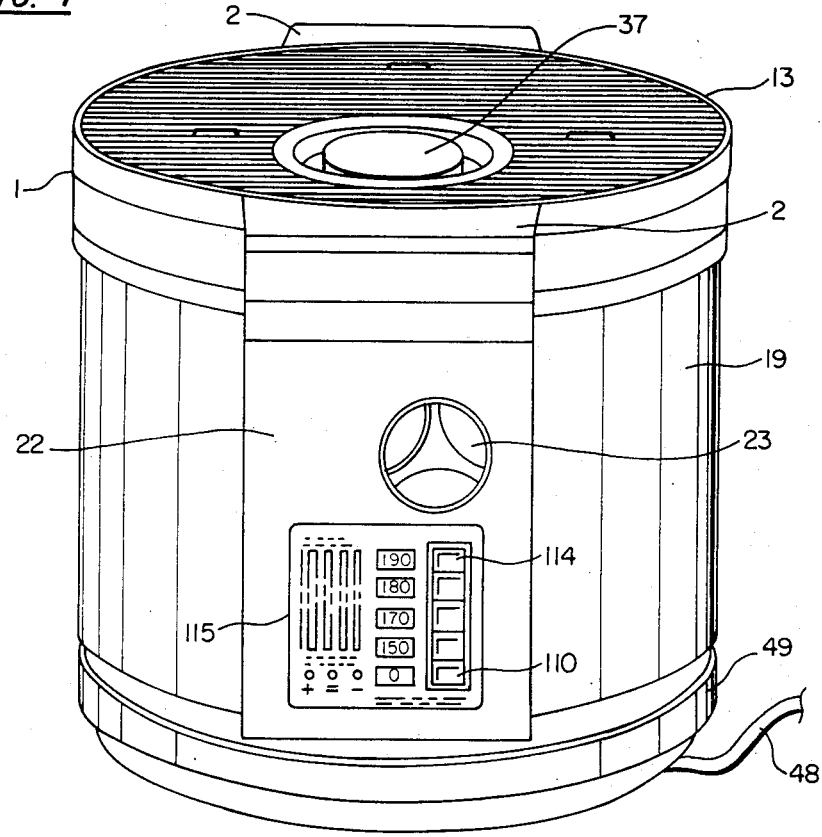
FIGS. 1 and 2 are perspective views of the fryer from the control panel side, in the closed and opened states respectively.
Figure 2:
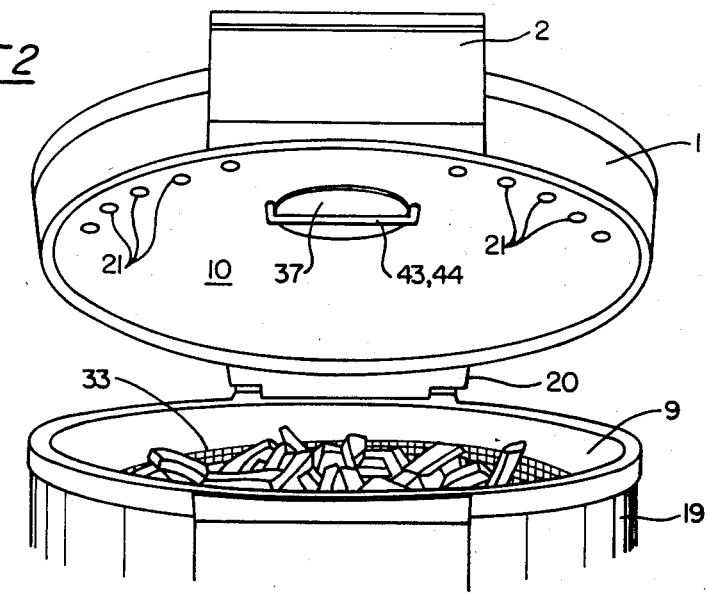
Figure 3:
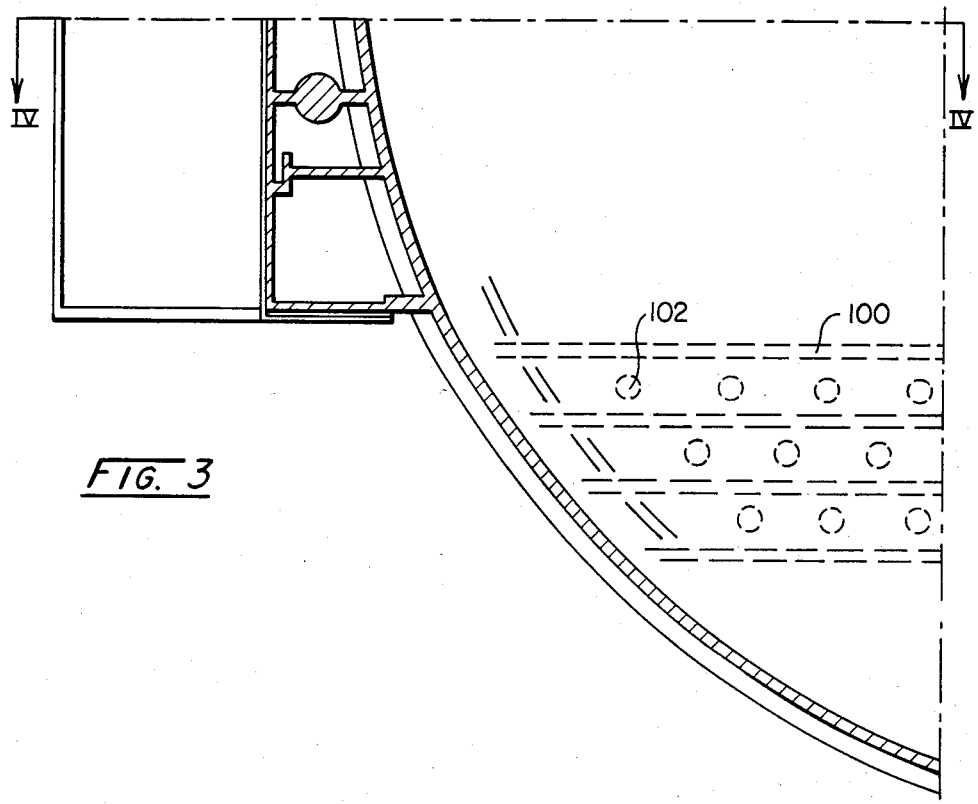
FIG. 3 shows a view from above, in partial section, on to the fryer at the hinge side after removal of the decorative grid.
Figure 4:
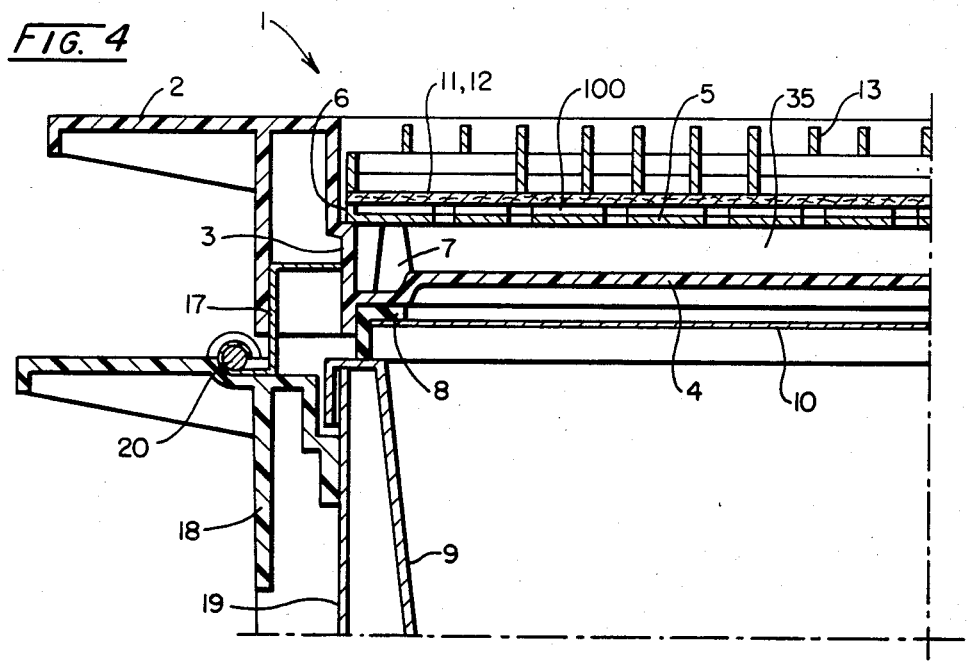
FIG. 4 shows a view in section of the same portion, with the addition of the decorative grid.
Figure 5:
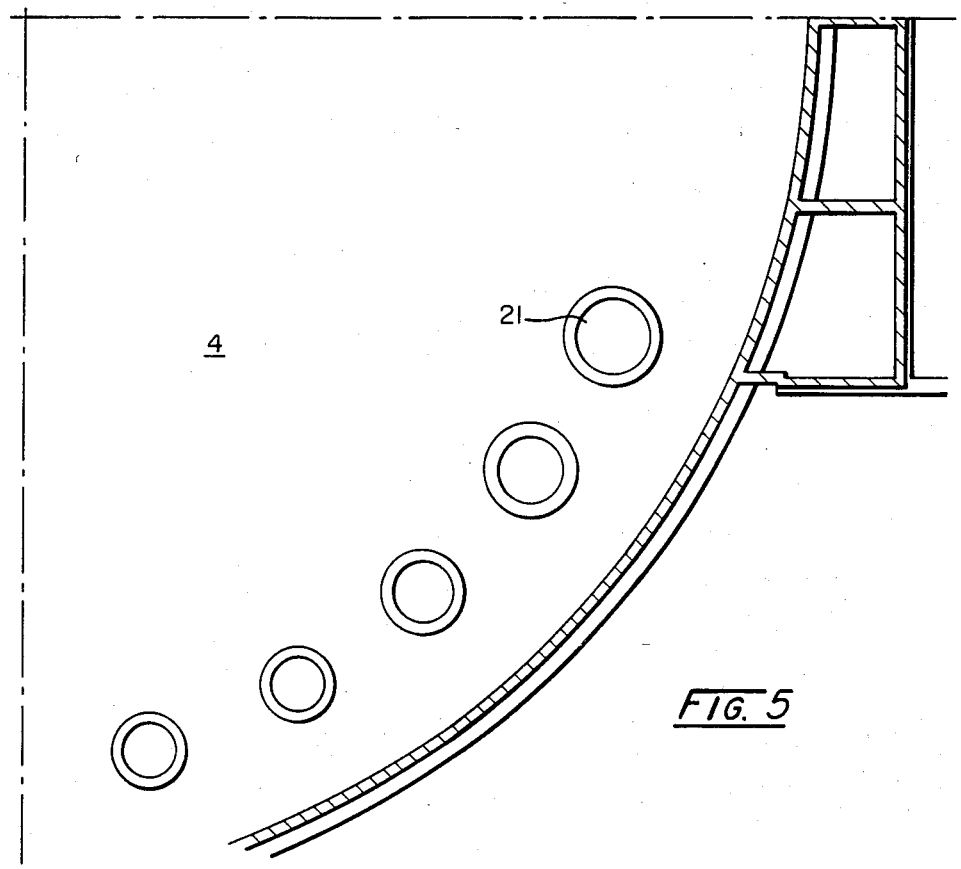
FIG. 5 is a view from above, partly in section, of the fryer at the control knob side after removal of the upper condenser.
Figure 6:
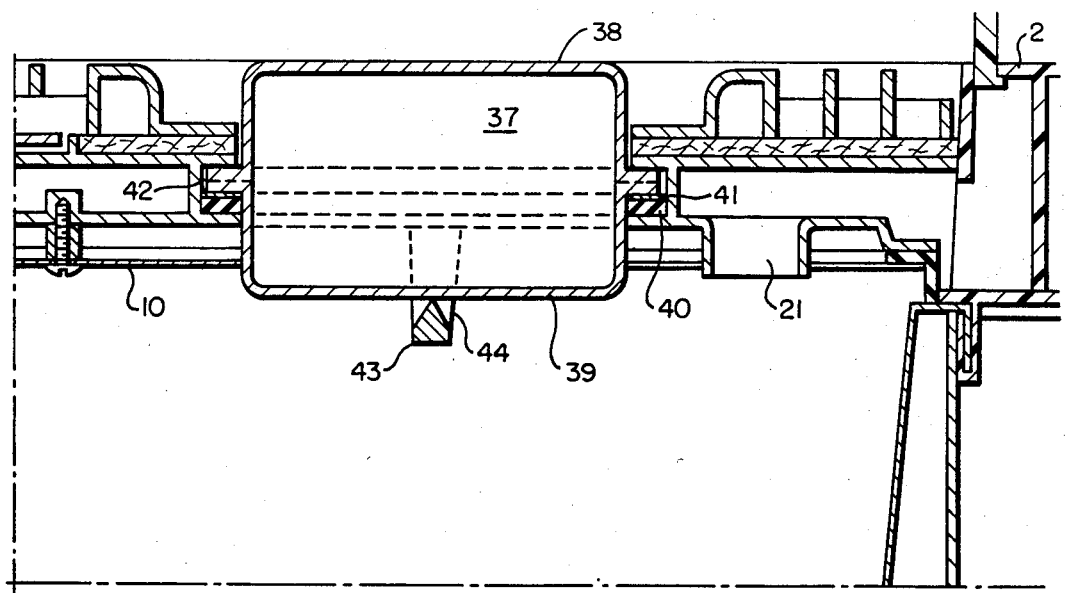
FIG. 6 is a section through this same portion with the upper condenser and the decorative grid also.
Figure 18A:
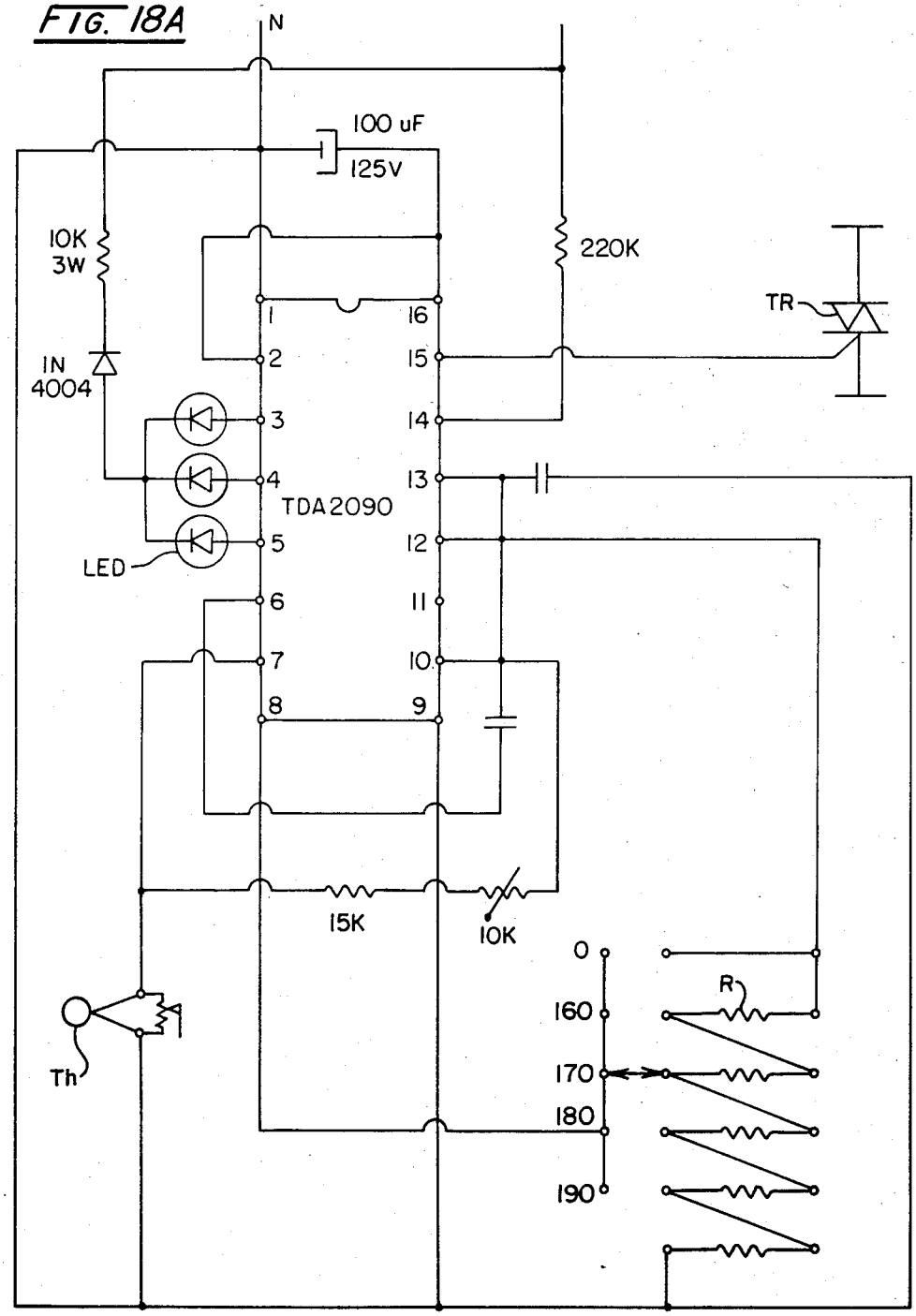

FIG. 18 gives the connection diagram of the electronic thermostat device.

In the various Figures like reference numerals are used to designate like parts.

The filtering lid comprises a main part 1 having the external form of the filtering lid and also handles 2 for manipulation purposes inter alia.

This main part comprises a wall 4 integral with the inner wall 3 of an external annulas of the lid and referred to here as the "lower condenser" or "lower condensation wall" 4.

The main part is made of thermoplastic material reinforced with glass fibre and heat resistant.

A wall 5, referred to here as "upper condenser" or "upper condensation wall" 5 is placed on the internal annular shoulder 6 of the lid and on studs 7 which are integral with the lower condenser 4 and which ensure maintaining a constant spacing between the internal surface of the upper condenser 5 and the upper surface of the lower condenser 4 constituting condensation chamber 35. Studs 7 are further provided with sleeves (not shown) for receiving screws (not shown) for fixing the upper condenser to the lower condenser.

The lid 1 also comprises a rubber sealing element 8 (L-shaped) which is positioned over the entire internal periphery of the filtering lid and ensures sealing-tightness between the lid proper and the aluminium cooking pot or chamber 9. This rubber sealing element has an 37 L" shaped cross-section allowing it to be held in position by a bright aluminium reflector 10 fixed to the internal wall 4 of the lid 1.

An activated carbon filter 11 associated with an anti-grease filter 12 situated upstream of the activated carbon filter is arranged on the upper condenser 5 and is held spaced therefrom by a series of ribs 100 allowing the vapours coming from the condensation chamber 35 to be distributed over the entire surface of the filter, so as to achieve optimum use of all of the anti-grease and activated carbon filters. This two-filter unit covers half of the total surface of the upper condenser and is held in position by a removably secured decorative grid 13.

This removable filtering lid is joined to the body of the fryer by a metal part 17 fixed in the aperture of the handle in the region of the hinge of the lid 1.

This metal hinge 17 is connected to the handle 18 integral with the external pot shell 19 by means of a detachable metal pin 20, permitting the fryer to be used with or without a filtering lid, the arrangement also being intended to facilitate the maintenance of the various parts of the fryer.

A group of ten ports or vents 21 situated in the region opposite from the activated filter and integral with the lower condenser 4 is arranged round the periphery of the filtering lid, ensuring communication between the cooking chamber 9 and the condensation chamber 33.

During the increase in temperature of the pool of oil contained in cooking chamber 9 which occurs until the temperature pre-selected at the thermostat is achieved, the reflector 10, the lower condenser 4, and the upper condenser 5 heat up to their operating temperature.

The temperature differences required for ensuring the functioning of the condensation system are guaranteed by the choice of materials used for the construction of these various parts, also by the volumes and spacings inherent in the construction.

The stability of the condenser temperature is of course ensured likewise by the temperature of the lower condenser of the neighbouring chamber, which during the vertical position of the lid transfers the heat stored in the material to the aluminium reflector.

By means of the control knob 23 and the basket lowering mechanism, the basket loaded with food is lowered into the pool of oil. A very short period of time elapses, the period required for the heating of the food, until its temperature is sufficient to cause the phenomenon of the evaporation of the water contained in the food. This period of time, however short, increases the temperature of the reflector 10, causing this temperature to be greater than the temperature corresponding to the water condensation point under normal atmospheric pressure.

Since the control of the electronic thermostat allows the selection only of oil pool temperature in excess of 100°, the temperature of the air situated between the lid and the pool of oil will be such that the temperature difference between the two faces of the reflector 10 prevents the condensation of the water on the lower surface of the reflector 10.

The temperature of the upper surface of this reflector is kept more or less constant by the superposition of the lower condenser 4 and the upper condenser 5, the temperature being maintained during the entire cooking by the transmission of heat brought by the vapours of the cooking liquid, and flowing into the condensation chamber 35 through the lower condenser wall 4.

The water and oil vapour is carried towards the condensation chamber 35 by way of the vents 21 in reflector 10 and condenser 4, the internal diameters of which are in decreasing order, so that the surface of the condenser 4 is used in optimum manner.

To guarantee that the temperature of the lower condenser 4 is not above the water evaporation point, it has been spaced from the reflector 10 by more or less 5 mm, and the surface of the condenser is integral over its periphery with the inner wall 3 of the external annulus of the lid 1, permitting the transfer of heat towards the exterior.

As for the upper condenser 5, its temperature is considerably below the condensation point, and by itself it effects approximately 80% of the condensate formation, insofar as the lower surface of the condenser 5 will be quickly saturated with water during the first half of the cooking period.

This saturation will result in the condensates falling on to the surface of the condenser 4. The temperature of these two condensers is such that the condensates remain within the condenser chamber. It is for example 80° C. for the lower condenser 4, about 50°-60° C. for the upper condenser 5. The low temperature of the condenser is also ensured by the position of the reflector 10 which acts as a heat shield and is taken to a temperature of about 110° C.

The water thus condensed considerably reduces the concentration of water in the vapour; the vapour remaining is removed through the condenser 5 by a whole series of orifices 102 formed in the condenser 5 below the oil filter and the activated carbon filter. This makes it possible to prolong the life of these two filters by reducing the concentrations of water and oil, this being effected in the case of the water by the condenser and in the case of the oil by the oil filter 12.

On the rear portion of the filtering lid there is arranged a duct 15 fitting into the recess of the handle in the hinge region and effecting the discharge of condensates when the filtering lid is opened. This discharge orifice is situated in the same plane as the upper surface of the lower condenser 4.

Therefore, the condensates are not discharged until during the opening of the lid, and at that time, because of the inclination of the surfaces of the condenser, the water flows naturally out towards this discharge orifice.

The water flows into a small funnel of the handle 18 to the collecting well 16 secured on the outside of the fryer, on the shell 19, below the handle 18.

This well is latched-on in such a manner as to allow it to be emptied quickly.

To obviate vapour also passing out, during cooking, through the condensate discharge ducting, in which case such vapour would no longer be filtered through the activated carbon, a sealing element 36 made of cellular flexible rubber is lodged in a cup of the handle 18, just below the lower orifice of the duct 15.

When the filtering lid 1 is in the horizontal position, that is to say when the fryer is closed, the lower orifice of the duct 15 penetrates slightly into the sealing element 36, thus ensuring the sealing-tightness of the ducting during cooking.

The sum of the cross-sections of passage in the discharge of vapour through the condenser 5 to the exterior is greater than the sum of the cross-sections of passage of the vents 21 in reflector 10 and condenser 4, so as to avoid too high a pressure in the chamber 35.

The system may be made even more effective by increasing the surface area of the upper condenser 5, for example, in sawtooth form, without however departing from the scope of the present invention.

To offer the user the possibility of operating the fryer with minimum discharge of odours during use, this fryer is provided with a mechanism allowing the basket to be displaced from the loading position (upper position) to the cooking position (lower position) by means of a control knob situated on the control console 22 of the appliance.

This allows the appliance to be kept closed except for loading and unloading operations.

This mechanism comprises a control knob 23 which is situated externally of the fryer and which when it is moved entrains a connecting pin 24. This connecting pin is connected mechanically with a small bar 25 and is guided through the cooking pot by means of a guide sleeve 26 crimped on to the said pot.

Sealing-tightness between the pin 24 and the guide sleeve 26 is ensured by a toroidal sealing element 27 made of silicone rubber received in a groove 104. The bar 25 is provided at its end with a pin 28 movable in a slot 29 formed in the mobile slide 30. The displacement of this slide 30 is effected by a guide 31 connected mechanically with the pot 9. The mobile slide 30 comprises at its upper portion a strap 103 with a central slot or identation intended for receiving the hook 32 welded to the basket 33.

When a rotational movement through 180° is imparted to the control knob 23 it is transmitted to the drive pin 28 which also offers a circular movement limited to 180°, allowing the displacement of the drive pin 28 from the upper position to the lower position and vice versa. The displacement of the drive pin 28 entrains the mobile slide 30, thus ensuring the movement of the basket 33 in the downward direction and in the opposite direction.

The total displacement necessary to lower the basket 33, which is in the upper position (position of readiness for loading and unloading), into the lower position (cooking position) determines the maximum travel of the basket, corresponding to the inter-axes distance between the main pin 24 and the drive pin 28.

This maximum travel is the result of the multiplication by two of the inter-axes distance between the part 24 and the part 28.

Because of the mechanical principle used, when the mobile slide is brought to its upper position, the final 10° of rotational movement in the upward direction of the drive pin 28 also effect the locking of this slide, thus guaranteeing greater stability in its highest position.

The descent of the basket, in association with the downward movement of the mobile slide, is braked by the high coefficient of friction between the shoulder 105 provided for retaining purposes on the knob 23 and the internal portion 106 of the annulus of the through passage in the handle 22. This coeffcient of friction is obtained by a spring 34 arranged in prolongation of the pin 24 and housed in the control knob 23, and by the play which exists between the knob 23 and the pin 24.

When the basket is positioned with its hook 32 in the specially provided indentation of the mobile slide 30, the filtering lid is put on to the pot.

The filtering lid is provided with a window of cylindrical shape 37 made of heat-resistant transparent material, which may be "Pyrex" glass or polyamide 12 type thermoplastic material resistant to heat and oils.

This window is constituted by two shells: an upper shell 38 and a lower shell 39.

These two shells are connected to one another mechanically (by welding inter alia). This assembly also comprises an annular sealing element made of cellular rubber 40 and an anti-friction washer 41 situated below the connection shoulder of the lower window shell.

The assembly is housed in a compartment 42 formed by two circular rings integral with the condenser 5 in its upper portion and with the condenser 4 in its lower portion, effecting sealing-tightness against vapour circulating in the condensation chamber.

The sealing element 40, the washer 41 and the window 37 are placed in that order in the compartment 42, and are held in place solely by the assembly of the condenser 5 in the lid 1.

The lower portion of the window 37 extends not only through the lower condenser 4 but also through the reflector 10, so that the lower surface of the shell 39 is situated in the cooking chamber. At the lower portion of the assembly described above there is provided a support 43 integral with the main lid 1, in which is housed, in its central web, a bevelled scraper 44 made of rubber. This support 43 is positioned diametrally under the lower surface of the shell 39 of the window 37.

The upper portion of the scraper 44 is in permanent contact with the lower surface of the shell 39.

During the cooking of food, and especially food containing a considerable quantity of water, the evaporation of this water caused by the high temperature of the pool of oil causes a slight natural condensation on the lower surface of the window 37.

To obviate this disadvantage, the system described by the present invention has been so designed that the thermal connection between the upper shell 38 and the lower shell 39 is slight, so that the lower shell 39, whose temperature rises very quickly due to its contact with the vapours coming from the pool, has a body temperature higher than that of the upper shell 38, which latter is in contact with the ambient air temperature.

Consequently the temperature difference between the two shells will be as high as possible. This difference is required for two reasons: firstly to make the temperature of the upper shell 38 sufficiently low to permit manipulation with one hand contacting the upper window without danger; secondly the temperature of the lower shell is to be if possible higher than 100° C. to obviate the natural condensation of water.

The scraper 44 coming into contact with the lower surface of the shell 39 serves to remove condensation which nevertheless forms.

Because of the cylindrical shape of the window 37 the user can give the window 37 a rotational movement towards the left or alternatively towards the right by a manual action, and the rotational movement is facilitated by the aforesaid mounting of the window 37 in the compartment 42.

This fryer is also provided with a detachable handle 45 made of spring steel wire with two arms 45a, 45b, so that after coupling with the basket the basket can be manipulated under the safest conditions for the unloading of food after cooking (FIGS. 16A, B and C).

Coupling this handle on to the basket is effected with the use of a latching stirrup 46 welded on the internal wall of the basket (FIG. 15).

Two rectangular recesses are provided on the two ends of the legs of the stirrup 46, for effecting the locking of the handle. The two arms of the handle 45 are subjected to pressure so as to make these arms approach one another, so that the folds 47 of the handle 45 engage into the recesses of the stirrup 46.

Unlocking, after the basket rests on its support in the interior of the pot, is brought about by an inverse movement to that described above.

The principle provided has the advantage of taking up any play which might be present, simply by the form of the folds and the spring character of the wire handle. As a result it is ensured that when the user turns the basket over to empty out the food the handle/basket coupling has maximum stability.

This fryer is also provided with a system for storing the supply cable 48 (FIG. 17).

This is achieved by the particular form of the base 49 of the fryer, inasmuch as an annular ring situated over the entire periphery and situated half way up the external vertical wall of the base provides a shoulder for supporting the supply cable, the latter can be arranged here in a double coil about the base of the fryer.

The end of the cable, constituted by a connecting plug 50 moulded on to the cable is inserted into a holder 51 of hook-shaped form integral with the base of the fryer.

The inevitable tolerance which has to be accepted as regards the length of the cord is compensated for by a coil spring 52 fitted over the cable, abutting on the portion where the plug/cable connection starts and bearing at its other end on the cord holder 51.

FIG. 18 shows the diagram for the electronic thermostat device.

This electronic thermostat comprises an integrated circuit of Plessey Semiconductors TDA 2090 type using the principle of balancing a resistance bridge constituted on the one hand by a thermistor Th arranged against the external wall of the cooking pot, and on the other hand by a reference resistor R selected from a five-resistor bridge, the selection being made by the use by means of a switch key or pushbutton system whose five pushbuttons 110–114 appear on the control panel 115 of the control console 116 of the fryer.

This integrated circuit by means of the gate of a triac TR controls the power circuit providing or withholding supply to the heating element and consequently ensuring stability for the temperature of the pool of oil.

Other than the triac, which is housed in the base of the fryer, the other components namely: the switch, the integrated circuit—the supply circuit for the electronic components, the variable potentiometer etc.—are fixed on a printed circuit situated in the casing of the main console, just behind the cover with the temperature information.

The switch comprises five pushbuttons which have the following functions:
1. STOP: stop appliance
2. 160° C.
3. 170° C.
4. 180° C.
5. 190° C.

Three LED diodes give the necessary information for using the fryer, insofar as:

the first indicates that the apparatus is switched on, the second lights up when the pre-selected temperature for the oil is reached, the third LED indicates that the temperature of the pool of oil is greater than the pre-selected temperature, thus indicating that the appliance is malfunctioning.

For example it indicates also that the user should wait to allow the pool of oil to fall again to the desired temperature, when he selects a temperature (for example 160°) lower than the temperature which had been reached for the previous use (for example 190°).

It will be understood that the appliance according to the invention may also be provided with a conventional electromechanical thermostat, this constituting no hindrance to this application.

The invention is not of course limited to the details described above. Many modifications may be made to it without departing from its scope.

I claim:

1. An electric fryer comprising a cooking chamber having an open top; and electric heating element associated with said cooking chamber, said heating element being operatively connected to an electric circuit whereby said cooking chamber can be heated; a filtering lid adapted to fit on said cooking chamber so as to close said open top provided with an external annulus, said filtering lid comprising a lower condensation wall and an upper condensation wall defining therebetween a condensation chamber; a reflector situated between said lower condensation wall and said cooking chamber; means providing communication between the cooking chamber and the condensation chamber; filter means carried by the upper condensation wall providing communication between the condensation chamber and the exterior of said filtering lid; and means for discharging towards the exterior of said filtering lid water of condensation collected in the condensation chamber.

2. An electric fryer according to claim 1, in which the reflector consists of a sheet of bright aluminium fixed to the lower face of the lower condensation wall, the lower condensation wall is integral with the inner wall of said external annulus, the upper condensation wall bears on an internal shoulder of said inner wall and on studs integral with the lower condensation wall, the latter also comprising sleeves for receiving screws for fixing the upper condensation wall to the lower condensation wall.

3. An electric fryer according to claim 1 in which the filter means comprise a filtering assembly including an activated carbon filter associated with an anti-grease filter situated upstream of the activated carbon filter, the filtering assembly being spaced from the upper condensation wall by ribs and the two filters being held in place by a detachable grid.

4. An electric fryer according to claim 1 in which a handle is provided with a duct openable towards the exterior and so arranged that when the filtering lid is raised the water of condensation which has collected in the condensation chamber flows into a tank fixed on the exterior of the fryer, and further, in which a compressible sealing element is arranged below the lower orifice of the duct in such a manner that when the filtering lid is in its horizontal closed position, the lower orifice of the duct penetrates slightly into the sealing element, thus ensuring the sealing-tightness of the duct during cooking, whereas during the opening of the filtering lid the water of condensation flows to the duct and through the latter into the tank.

5. An electric fryer according to claim 1 in which "a window mounted rotatably in the filtering lid is provided with a scraper," the window comprising an upper shell and a lower shell which are mounted to be rotatable in sealing-tight manner in a compartment, the lower portion of the window extending through not only the lower condensation wall, but also the reflector, in such a manner that the lower surface of the lower shell is situated in the cooking chamber, and a support integral with the filtering lid is provided at the lower portion of the filtering assembly, the support comprising a scraper whose upper portion is in permanent contact with the surface of the lower shell.

6. An electric fryer according to claim 1, in which the communication means between the cooking chamber and the condensation chamber comprises a group of vents in said lower condensation wall and said reflector, and in which the communication means between the condensation chamber and the filter means comprises a series of orifices formed in the upper condensation wall below the filtering assembly.

7. An electric fryer according to claim 6 in which said orifices are located in a section of said upper condensation wall which is opposite to the section of said lower condensation wall and said reflector in which said vents are located.

8. An electric fryer according to claim 7 in which said vents are in an order of decreasing diameter starting at a point most distant from said section of said upper condensation wall in which said orifices are located.

* * * * *